(12) United States Patent
Koto et al.

(10) Patent No.: US 8,780,708 B2
(45) Date of Patent: Jul. 15, 2014

(54) TRANSMISSION CONTROL SYSTEM

(75) Inventors: Hideyuki Koto, Fujimino (JP);
Yasuhiko Hiehata, Fujimino (JP);
Satoshi Uemura, Fujimino (JP); Hajime Nakamura, Fujimino (JP)

(73) Assignee: KDDI Corporation, Tokyo (JP)

( * ) Notice: Subject to any disclaimer, the term of this patent is extended or adjusted under 35 U.S.C. 154(b) by 878 days.

(21) Appl. No.: 12/413,847

(22) Filed: Mar. 30, 2009

(65) Prior Publication Data

US 2009/0245106 A1 Oct. 1, 2009

(30) Foreign Application Priority Data

Mar. 31, 2008 (JP) ................................. 2008-094208

(51) Int. Cl.
*H04L 12/02* (2006.01)

(52) U.S. Cl.
USPC ......... 370/230; 370/395.2; 709/225; 709/235

(58) Field of Classification Search
USPC ........... 370/230, 230.1, 231–235, 235.1, 236, 370/236.1, 236.2, 253, 395.2, 395.21; 709/224–226, 231, 233, 235
See application file for complete search history.

(56) References Cited

U.S. PATENT DOCUMENTS

| | | | |
|---|---|---|---|
| 5,974,572 A | 10/1999 | Weinberg et al. | 714/47 |
| 6,885,634 B1* | 4/2005 | Choudhury et al. | 370/217 |
| 2002/0019837 A1 | 2/2002 | Balnaves | 707/512 |
| 2002/0107953 A1* | 8/2002 | Ontiveros et al. | 709/224 |
| 2004/0107267 A1 | 6/2004 | Donker et al. | 709/218 |
| 2008/0016214 A1* | 1/2008 | Galluzzo et al. | 709/226 |
| 2008/0049786 A1* | 2/2008 | Ram et al. | 370/468 |

FOREIGN PATENT DOCUMENTS

| | | |
|---|---|---|
| JP | 2007048808 | 2/2007 |
| JP | 2008211730 | 9/2008 |

OTHER PUBLICATIONS

Combined Search and Examination Report under Sections 17 and 18(3) for Application No. GB0905579.9; date Jul. 6, 2009; 6 pages.

\* cited by examiner

*Primary Examiner* — Hoon J Chung
(74) *Attorney, Agent, or Firm* — Westman, Champlin & Koehler, P.A.

(57) ABSTRACT

A control server 4, receives the number of user terminals U which have transited to the individual Web pages from a monitoring server 3 in Step S41. In Step S42, based on the received number of transitions U of the individual Web pages, application of control is decided by the control server 4. Here, based on the assumption that the number of transitions Uc to a Web page C including a transaction access or hyper link to the end server 2 accurately represents the number of executed transactions, the number of transitions Uc to Web page C is compared with an upper limit value Cmax. When Uc<Cmax, the process proceeds to Step S43 and a control information is sent from the control server 4 to the user terminals 1 to cancel the application of control.

3 Claims, 5 Drawing Sheets

| WEB PAGE | NUMBER OF TRANSITIONS (U) |
|---|---|
| TOP | Ut |
| A | Ua |
| B | Ub |
| C | Uc |
| D | Ud |

TRANSMISSION CONTROL SYSTEM

The present application claims priority of Japanese patent application Serial No. 2008-094208, filed Mar. 31, 2008, the content of which is hereby incorporated by reference in its entirety.

BACKGROUND OF THE INVENTION

1. Field of the Invention

The present invention relates to a transmission control method for controlling the number of access from user terminals to an end server and also relates to a system thereof. In particular, the present invention relates to the transmission control method which estimates the volume of access from user terminals to the end server in advance to control the access from individual user terminals based on the estimated result, thereby controlling the congestion of the end server and also relates to the system thereof.

2. Description of the Related Art

Due to the widespread of mobile terminals with Internet connectivity, sudden surge or increase of access requests caused by special events are becoming a major problem for mobile network carriers/operators. For example, vast volume of access requests could arise during interactive TV programs, such as viewers sending their answers during a quiz show. In addition, these accesses by vast number of viewers tend to concentrate in a short period of time. If such kind of interactive TV programs are provided in a daily basis, the system capacity of the end server, which accepts these requests from the users and provides the interactive TV service, could be used up causing overloads and congestion. And in the worst case, this could result in an operation halt of the server.

In order to solve the above-described technical problems, a technology has been disclosed where an access path server is set in addition to an end server. The access path server decides the access timing of a request from the viewers to the end server. Here, the access timings are calculated based on the server capacity and the prior received volume of access, so that the access sequence of requests are kept in sequential order. The calculated access timing is notified to the user terminals in the form of an access path. User terminals receiving the access path wait and suspend their access until the notified time has elapsed. After suspension, the user terminals are allowed to access the end server.

In the above-described conventional technology, if requests are accepted up to the capacity limit of the end server, accesses can be efficiently processed. However, it is difficult to find the accurate capacity and its surplus of the end server. Therefore, the end server has been generally operated under conditions lower than the capacity limit.

Patent Document 1 has disclosed a technology that controls the access requests from the vast number of viewers by utilizing sample monitoring and dynamic suspension and release of access. Firstly, a part of the viewers generating the access requests are classified into sample and the rest is classified as non-sample. The accesses by sample are allowed to generate freely while the accesses by non-sample are suspended at the terminal. The volume of access by the sample is then monitored and using the monitored volume, the total volume including that of the non-sample is estimated. Control information to release the suspended access of the non-sample is then calculated using the estimated volume and the end server capacity. The calculated control information is advertised to viewers using the broadcasting channel. Consequently, the suspended accesses are released so that the volume after release is controlled near a target value, such as the system capacity. In addition, accesses are released so that the release timings are in sequential order.

Patent Document 1: Japanese Published Unexamined Patent Application No. 2007-48808

In the above-described conventional technology, the access requests by the sample had to be allowed to generate, and hence arrive at the end server, in order to monitor its volume. In addition, access by the non-sample is controlled only after the access by the sample is monitored. Therefore, access by the non-sample had to be temporally suspended until the control information which allows the release of such accesses are received.

SUMMARY OF THE INVENTION

An object of the present invention is to provide a transmission control method where the volume of user access is estimated in advance and based on the estimated result, access to the end server is controlled, and also to provide a system thereof. The present invention is a transmission control system for controlling the number of access from user terminals to an end server to prevent overload and congestion of the end server in which the following means are provided.

(1) The present invention includes means for detecting the Web pages having an access or hyper link to the end server in which the individual user terminals have transited, means for counting the number of user terminals which have transited to the individual Web pages, and means for controlling the access requests from the individual user terminals to the end server when the number of user terminals which have transited to a predetermined Web page exceeds the target value representative of the acceptance capacity of the predetermined end server.

(2) In the present invention, the predetermined Web page includes an access or hyper link to the end server.

According to the present invention, the following effects can be obtained.

(1) The volume of access request transmitted from the user terminals to the end server can be estimated before requests are actually transmitted to the end server. Therefore, efficient control of access request to the end server becomes possible.

(2) Since users which have transited to a Web page including an access or hyper link to the end server are likely to access and transit to the end server, an accurate estimation of the volume of access connecting to the end server becomes possible.

DETAILED DESCRIPTION OF THE PREFERRED EMBODIMENTS

Figure 1:
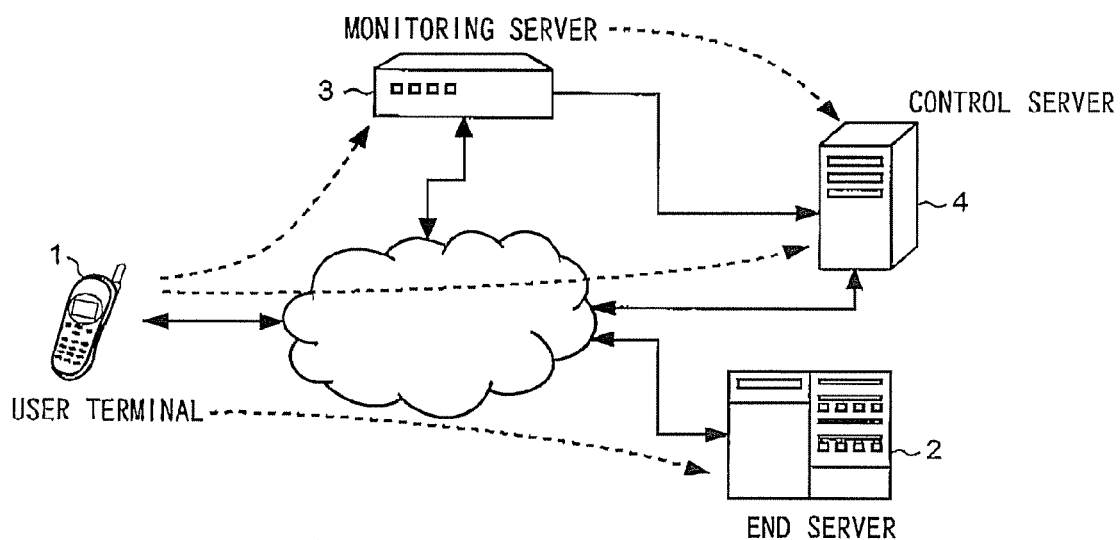
FIG. 1 is block diagram of a network in which the transmission control method of the present invention is applied.

Hereinafter, a description will be given for a preferred embodiment of the present invention by referring to the drawings. FIG. 1 is a block diagram showing a network composition when the transmission control method of the present invention is applied. User terminals 1 transmit an access request to the end server 2 via the WEB page that contains a transaction access or hyper link to the end server. Examples of these transaction access requests are transmission of an answer to an interactive quiz show, request to download multi-media data files such as music files of a TV program etc. A monitoring server 3 (1) monitors the Web pages in which individual user terminals 1 have transited (2) counts the number of user terminals U which have transited to the individual Web pages and (3) sends the counted result to the control server 4.

In the present embodiment, only a part of the user terminals 1 are monitored by the monitoring server 3. That is, sample monitoring technique is utilized so that a part of the user terminals 1 chosen as sample represent the transition of all the user terminals 1. The monitoring server 3 monitors the transition source Web pages and transition destination Web pages of the sample user terminals 1. In the present embodiment, the sample user terminals 1 actively notify the monitoring server 3 of the transition destination Web pages. However, the present invention shall not be limited to the present embodiment. For example, the present invention could have other forms of implementation where (1) the monitoring server 3 monitors the packets transmitted through the network, (2) analyzes the transition source Web pages and transition destination Web pages from the monitored packet, and (3) records the analyzed results. Sample monitoring could be adopted to this monitoring method as well where only the packets from the sample user terminals 1 are monitored and recorded. In other words, monitoring connections of all user terminals are not necessary, and monitoring only a part of connections which is generated by the sample user terminals is sufficient. Random sampling could be used as the sampling Method. Consequently, monitoring and analyzing loads can be mitigated.

The control server 4 estimates the load of the end server 2 based on the number of user terminals U that have transit to a predetermined Web page. When the end server 2 is estimated to be overloaded and congested, transaction access requests from the user terminals 1 are controlled and temporarily suspended at the terminal. The suspended accesses are released so that the access volume after release is controlled within the capacity of the end server 2. In addition, accesses are released so that the sequential order of their generated timings is kept in order. The end server 2 accepts to the access request transmitted from the user terminals 1. After reception, the end server 2 processes the received request accordingly. For example, if the request is a data transmission from the user terminal, such as receiving an answer data for an interactive quiz, the end server 2 records the received message data to a data base. If the request is a download request of a multimedia content, such music file, the end server 2 delivers the requested contents from the data base to the user terminals 1 which sent the requests.

Figure 2:
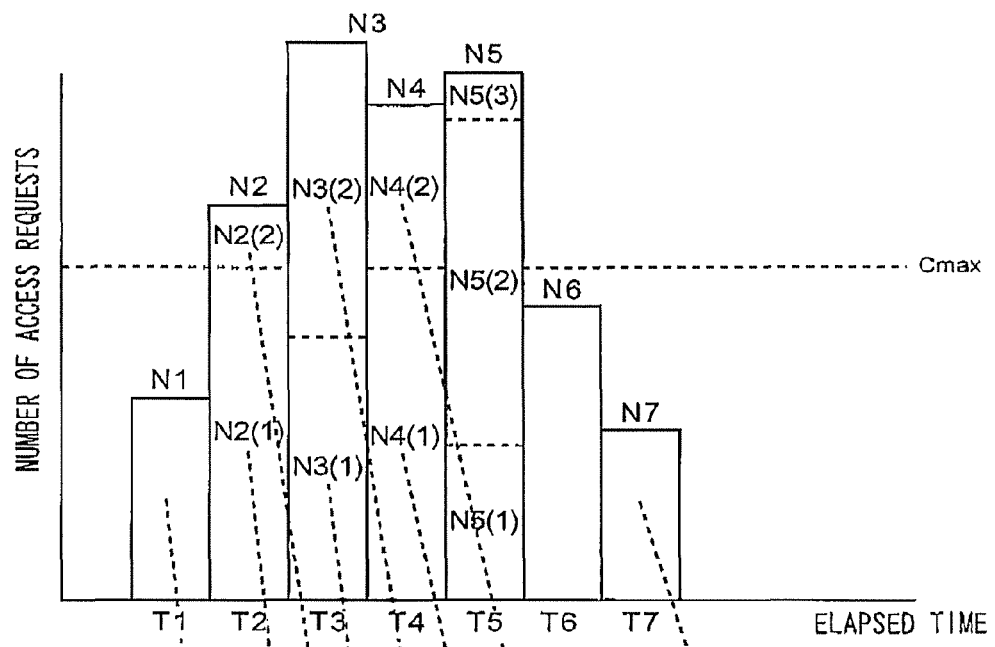
FIG. 2 is a pattern diagram showing the concept of the control method to suspend and release the access requests from the users.
Figure 2:
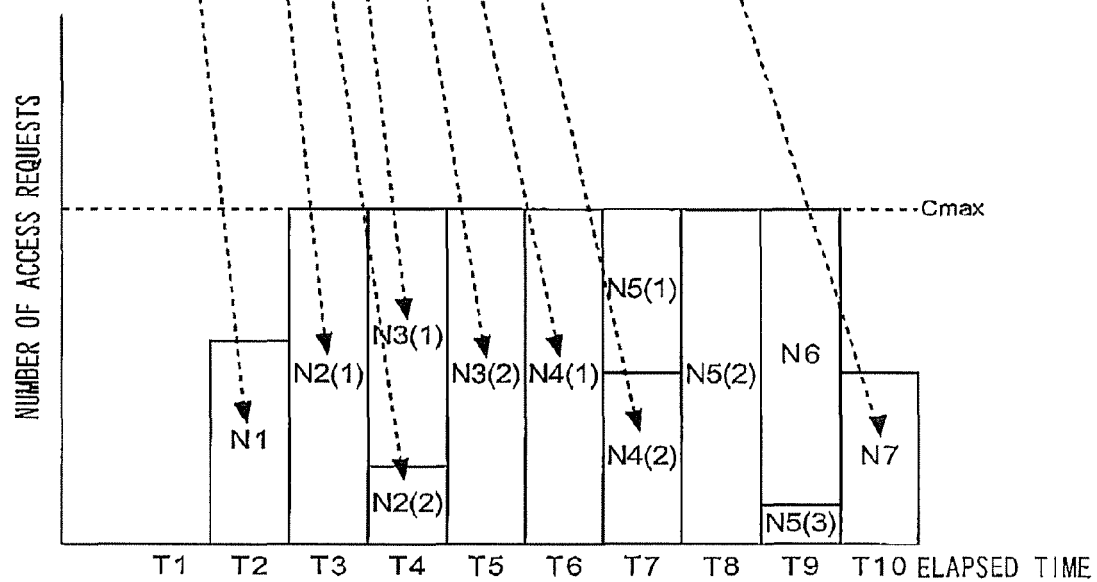

FIG. 2 is a pattern diagram showing the concept of the control method applied by the control server 4 to suspend and release the access requests from the user terminals 1. An upper limit value Cmax for the number of access requests N which an end server is able to accept within a predetermined period of time T is set in advance at the end server 2.

In FIG. 2, since the number of access requests N1 during the time period T1 is less than an upper limit value Cmax, the access requests N1 are allowed to transmit straightaway at the next time period T2. Meanwhile, the number of access requests N2 during the time period T2 exceeds the upper limit value Cmax, so they are controlled as follows. The number of access requests N2(1) which is equal to the upper limit value Cmax is released and allowed to transmit at the next time period T3. However, the remaining number of access requests N2(2) that exceeds the upper limit value Cmax are suspended from transmission until the time period T4.

Furthermore, the number of access requests N3 during the time period T3 exceeds the upper limit value Cmax. In addition, some capacity of the upper limit value Cmax is already assigned to the previous N2(2). Therefore, the number of access requests N3(1) that corresponds to the upper limit value Cmax−N2(2) are released and allowed to transmit at the time period T4. The remaining number of access requests N3(2) are released and allowed to transmit during the time period T5. The above-described method for controlling transmission of access requests has been disclosed in Japanese Patent Application No. 2007-48808 filed by the inventor of the present invention and others.

Figure 3:
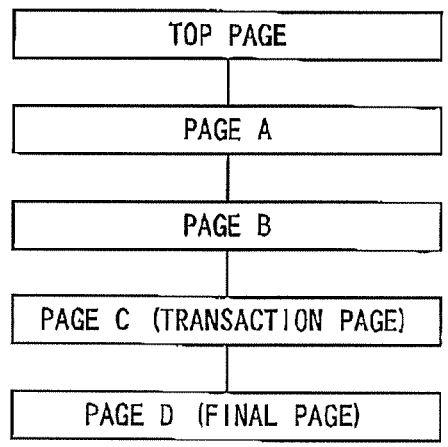
FIG. 3 is an example of the sequence flow of WEB pages including the transaction page.

Meanwhile, the transaction Web site provided by the end server 2, as an example in FIG. 3 shows, generally constitutes of multiple Web pages (five Web pages in the present embodiment). The user terminal 1, which accesses the transaction Web site, transits to the top page first, and then to page C via pages A and B. In the present embodiment, an access or hyper link that generates the transaction to the end server 2 is stated at the transmit button in the Web page C. When a message, such as an answer of a quiz, is written into the preset input field of page C and after the transmit button is pressed, a transaction access request to transmit and upload the written message is sent to the end server 2. When the message transmitted by the user terminal 1 is received and processed at the end server 2, the user terminal 1 transits to page D and completes the transaction sequence. In the present embodiment, as will be described hereinafter in detail, the number of user terminals Uc which have transited to the Web page C, that includes a transaction access or hyper link to the end server 2 to execute the transaction, is regarded as the number of access requests N shown in FIG. 2. The present invention controls the number of access requests using this number of user terminals Uc.

Figure 4:
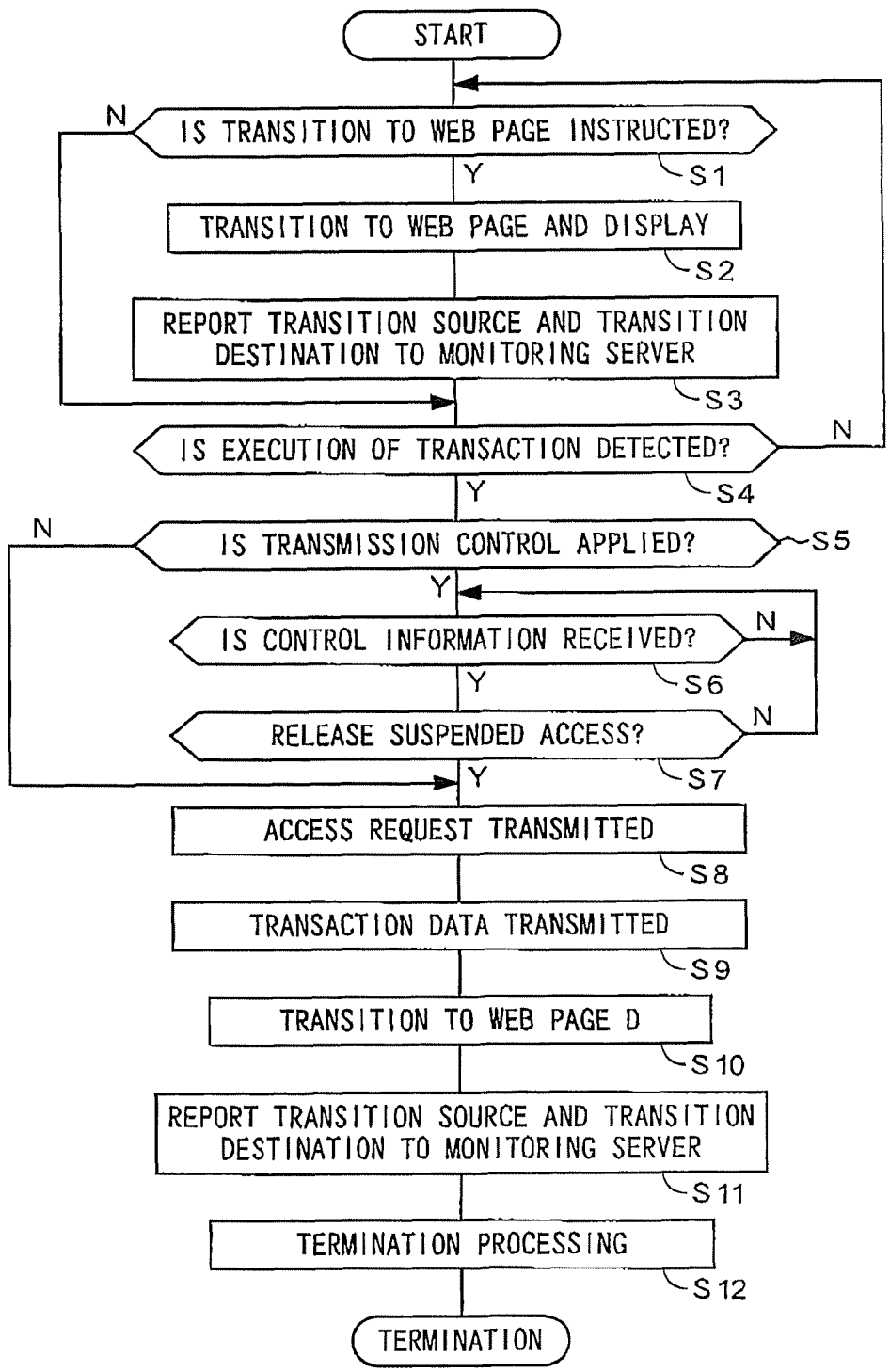
FIG. 4 is a flow chart showing methods of a user terminal with the present invention implemented.
Figure 5:
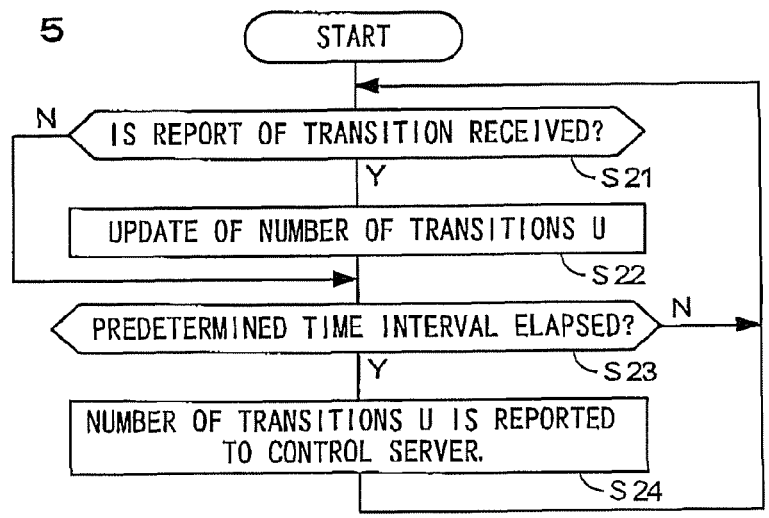
FIG. 5 is a flow chart showing methods of a monitoring server with the resent invention implemented.
Figure 6:
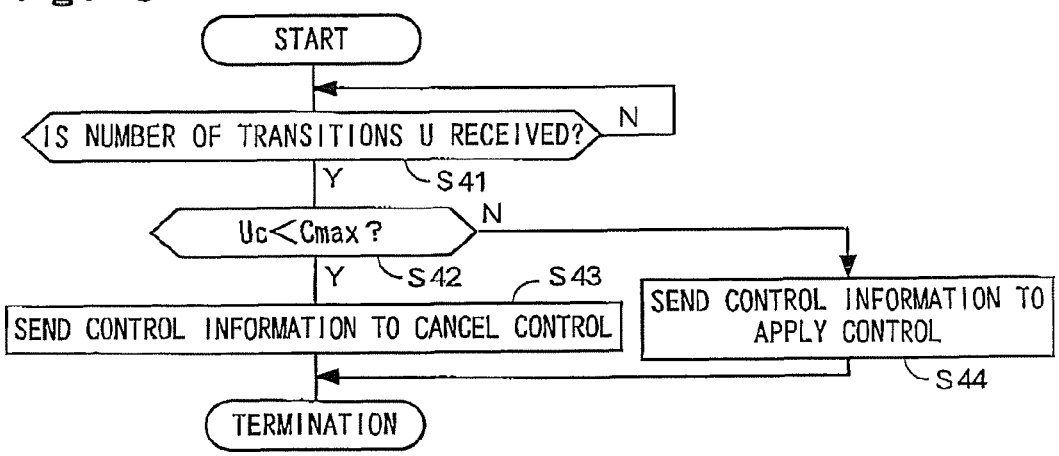
FIG. 6 is a flow chart showing methods of a control server with the present invention implemented.
Figure 7:
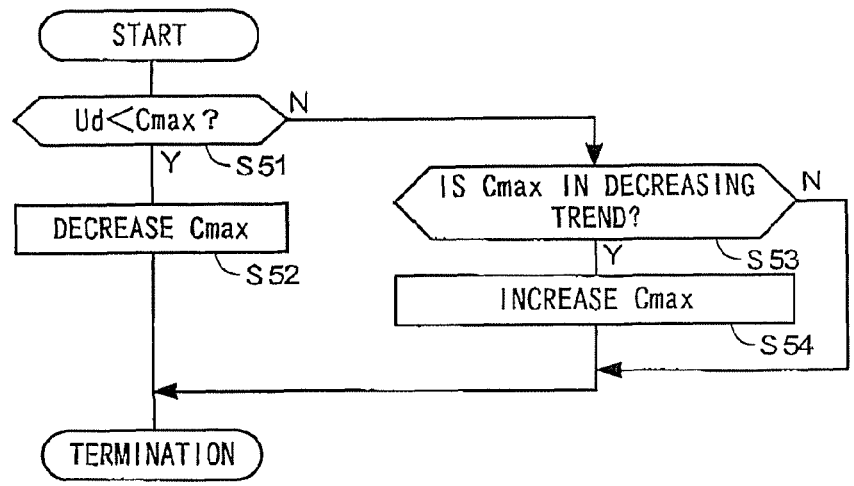
FIG. 7 is a flow chart showing methods of a control server with the present invention implemented.

Next, with reference to the flow charts, a detailed description will be given for the transmission control method of the present invention. FIG. 4 is a flow chart showing the methods of a user terminal 1 with the present invention implemented FIG. 5 is a flow chart showing the methods of a monitoring server 3 with the present invention implemented. FIGS. 6 and 7 are flow charts showing the methods of a control server 4 with the present invention implemented.

As shown in Step S1 of FIG. 4, the user terminal 1 visiting the transaction Web site transits to the top page, and displays the top page in Step S2. In Step S3, unique identification information (e.g., URL) of a transition source Web page and a transition destination Web page is notified to the monitoring server 3. The above processing is performed every time a user terminal 1 transits to other pages A, B and C.

Next, when a message to be transmitted is written in the predetermined input field of the Web page c and the transmit button is pressed in Step S4, the processing proceeds to Step S5. Here, the user terminal 1 checks whether the transmission control is applied or not. If the transmission control is not applied, the process proceeds to Step S5, and the message transmission to the end server 2 is performed immediately. In Step S9, after an access or connection establishment response from the end server 2 is received, data of the input message is sent.

Meanwhile, when the transmission is applied at Step S5, the process proceeds to Step S6. Here, the message transmission to the end server 2 is temporarily suspended at the user terminal 1, until a control information to release the suspended access is sent from the control server 4. After receiving the control information with the release message, the process proceeds to Step S7. The user terminal 1 with the suspended access checks the received control information to decide whether or not the current suspended access could be released and allowed to transmit. If the suspended access is released, the process proceeds to Step S8 and the message transmission to the end server 2 is performed. In Step S9, after an access or connection establishment response from the end server 2 is received, data of the input message is sent.

When the transmitted message from the user terminal 1 is received and processed at the end server 2, the process proceeds to Step S10 and the user terminal 1 transits to the Web page D (the final page). In Step S1, the unique identification information of the transition source Web page C and the transition destination Web page D, respectively, are notified to the monitoring server 3. In Step S12, a predetermined completion processing is executed.

As shown in Step S21 of FIG. 5, the monitoring server 3 receives the transition information from the user terminal 1. The transition information includes the unique identification information of the transition source Web page and the transition destination Web page. After Step S21, the process proceeds to Step S22, where the number of transitions U (Ua, Ub, Uc, Ud) which correspond to each Web page are calculated and updated. That is, the number of transitions U of the transition source is decreased or decremented, while the number of transitions U of the transition destination is increased or incremented.

In Step S23, the control server 3 calculates the time interval between the current time and the time in which the most recent report was submitted to the control server 4. If the calculated time interval is smaller than the preset time period for submitting report to the control server 4, the process returns to Step S21 and the above processing is repeated until the calculated time interval exceeds the preset time period. When the calculated time interval exceeds the preset time interval, the process proceeds to Step S24 and the report with the numbers of transitions U for the Web pages are submitted to the control server 4.

Figures 8, 9:
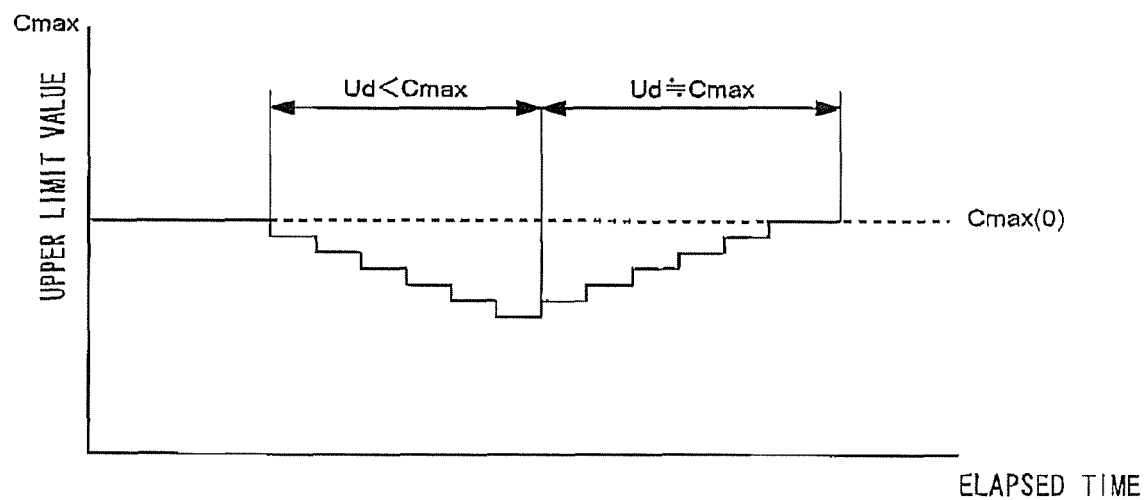
FIG. 8 is a table showing one example of the number of WEE transitions reported from the monitoring server to the control server.
FIG. 9 is a diagram showing a method to control the upper limit value Cmax of access requests which an end server is able to accept.

As shown in Step S41 of FIG. 6, the control server 4 receives the report, including the numbers of transitions U for each Web page, from the monitoring server 3. FIG. 8 is a table showing one example of the numbers of WEB transitions reported from the monitoring server 3 to the control server 4. The numbers stated in the table represent the numbers of the user terminals 1 which transited to and still visiting the individual Web pages, Ut, Ua, Ub, Uc, Ud. In Step S42, based on the number of transitions U of the individual Web pages, a decision is made whether to apply control or not.

The present embodiment assumes that the number of transitions Uc of the Web page C, which includes a transaction access or hyper link, accurately represents the number of transactions that are actually executed, thus the load to the server, by the user terminals 1. Based on this assumption, the number of transition Uc of the Web page C is compared with the upper limit value Cmax. When Uc<Cmax, the process proceeds to Step S43 and control information to release the suspended accesses are sent to the user terminals 1. When Uc≥Cmax, the process proceeds to Step S44 and control information, to apply control which suspends the accesses, is sent to the user terminals 1.

The control information sent is used as information for Step S5 (FIG. 4) in each user terminal 1 receiving such control information. That is, the user terminal 1 that receives the control information stating to apply no control, the condition branching of Step S5 of FIG. 4 is determined as negative and no control is applied. In this case, transmissions by all users are allowed and immediate message transmissions are performed and submitted to the end server 2. On the other hand, when the user terminal 1 receives the control information stating to apply control, the condition branching in Step S5 of FIG. 4 is determined as positive and the predetermined control is applied and generated accesses are suspended at the terminal. Consequently, some if not all transaction access requests are suspended.

Additionally, the control server 4 dynamically controls the upper limit value Cmax. Specifically, the upper limit value Cmax is dynamically varied from its standard value of Cmax (0). In Step S51 of FIG. 7, the number of transition Ud of the Web page D is compared with the current upper limit value Cmax. When Ud<Cmax, the process proceeds to Step S52, and the upper limit value Cmax is decreased or decremented.

That is, when the number Ud which represents the number of users transited to the final page D after transaction is smaller than the current upper limit value Cmax, it indicates that the overloads of the end server 2 have occurred. If this is true, the transaction access could have been discarded, resulting in the decrease of Ud compared to Cmax. Therefore, as shown in FIG. 9, an upper limit value Cmax is decreased or decremented to avoid further congestion of the end server 2.

Meanwhile, when the number of transitions Ud of the Web page D is approximately equal to the upper limit value Cmax, the process proceeds to Step S53. Here, the trend of the recent upper limit value Cmax is checked. When the upper limit value Cmax is in a decreasing trend, the process proceeds to Step S54. As shown in FIG. 9, in order to receive and accept more transaction accesses from the user terminals 1, the upper limit value Cmax is increased or incremented up to the standard value Cmax (0). Furthermore, when the trend is not a decreasing one, the upper limit value Cmax is maintained as the present value. That is, when the number of user terminals Ud after transaction is approximately equal to the upper limit value Cmax, the end server 2 is presumed to be in normal state (i.e. not in congestion and overload). Therefore, the control server 4 assumes that no transaction accesses were discarded, and thus the upper limit value Cmax is increased in order to accept and process more accesses.

In addition, the number of user terminals Nother which did not transit from page C to page D or which did not execute or gave up the transaction could also be taken into account. Situation example of Nother to occur is errors in the wireless access network e.g. mobile phone network. In such a case, the sum of the number of user terminals Nother and the number of user terminals Ud is compared with the upper limit value Cmax.

In the above-described embodiment, the transmission control method by the present invention is performed using the number of transitions to the Web page C which includes the transaction access or hyper link to the end server 2. However, other forms of embodiment where the number of transition of other Web pages which do not include the transaction access or hyper link could be used also. Such number of transition of other Web page should represent the load of the end server 2, in some form.

What is claimed is:

1. A transmission control system which controls access requests from user terminals to an end server to control congestion of the end server, the transmission control system comprising:
  a monitoring server for detecting Web pages in which individual user terminals have transited inside a Web site which includes a transaction access request or hyper link to the end server;
  the monitoring server further for counting the number of user terminals which have transited to the individual Web pages; and
  a control server for suspending the transaction access requests from the individual user terminals to the end server when the end server is estimated to be overloaded based on monitoring user actions by monitoring the number of user terminals which have transited to a predetermined Web page exceeds a predetermined reference value representative of the acceptance capacity of the end server without directly monitoring the end server;

wherein:
  the predetermined Web page includes a transaction access or hyper link for executing transaction to the end server;
  the control server changes the predetermined reference value based on the comparison of the number of user terminals which have transited to the predetermined Web page which is to be transited after completing transaction to the end server with the predetermined reference value after applying the suspension;
  the monitoring server detects the number of user terminals which did not execute the transaction to the end server among the user terminals transited to the predetermined Web page; and
  the control server changes the predetermined reference value on the basis of the number of user terminals which have transited to the predetermined Web page to be transited after completing the transaction to the end server, the predetermined reference value, and the number of user terminals which did not execute the transaction to the end server.

2. The transmission control system as set forth in claim 1, wherein the monitor server counts a sample of the user terminals which have transited to the individual Web pages.

3. The transmission control system as set forth in claim 1, wherein the control server suspends accesses from at least a sample of the user terminals and sequentially releases the suspended accesses in sequence so as to avoid a congestion of the end server.

* * * * *